(12) United States Patent
He (10) Patent No.: US 11,936,224 B1
(45) Date of Patent: Mar. 19, 2024

(54) FOLDABLE WIRELESS CHARGING STAND

(71) Applicant: Shangxing Technology (shenzhen) Co., Ltd., Shenzhen (CN)

(72) Inventor: Shuwei He, Changsha (CN)

( * ) Notice: Subject to any disclaimer, the term of this patent is extended or adjusted under 35 U.S.C. 154(b) by 0 days.

(21) Appl. No.: 18/476,244

(22) Filed: Sep. 27, 2023

(30) Foreign Application Priority Data

Sep. 30, 2022 (CN) .......................... 202222612592.5

(51) Int. Cl.
*H01M 10/46* (2006.01)
*H02J 7/00* (2006.01)
*H02J 50/00* (2016.01)

(52) U.S. Cl.
CPC .......... *H02J 7/0044* (2013.01); *H02J 50/005* (2020.01)

(58) Field of Classification Search
CPC ...... H02J 7/0042; H02J 7/0044; H02J 50/005; H02J 50/10
USPC .......................... 320/107, 108, 114, 115, 116
See application file for complete search history.

(56) References Cited

U.S. PATENT DOCUMENTS

2023/0327477 A1* 10/2023 Salzinger ................ H02S 10/40
320/101

FOREIGN PATENT DOCUMENTS

| CN | 103701179 A | * | 4/2014 | |
|---|---|---|---|---|
| CN | 113162158 A | * | 7/2021 | ............ H02J 50/005 |
| CN | 114465368 A | * | 5/2022 | |
| KR | 20220131713 A | * | 9/2022 | |
| KR | 102530280 B1 | * | 5/2023 | |

OTHER PUBLICATIONS

Google Translate of CN113162158A (Jul. 23, 2021) (Year: 2021).*

* cited by examiner

*Primary Examiner* — Edward Tso

(57) ABSTRACT

The present disclosure provides a foldable wireless charging stand, including at least two wireless charging modules electrically connected to each other through a wire. An articulation assembly includes an articulation sleeve and an articulation shaft rotatably; a mounting notch is defined on a peripheral edge of one of two adjacent wireless charging modules, and a peripheral sidewall of the articulation sleeve is fixedly connected to the other wireless charging module. The articulation sleeve defines a first opening, a second opening, and a wire passage hole; the articulation shaft has a rotation portion and a mounting lug protruding from an outer surface of the rotation portion; the rotation portion is rotatably embedded in the articulation sleeve through the second opening; the mounting lug is exposed to the second opening and fixedly connected to the wireless charging module; the wire passes through the first opening and the wire passage hole.

20 Claims, 8 Drawing Sheets

FOLDABLE WIRELESS CHARGING STAND

CROSS REFERENCE TO RELATED APPLICATIONS

The present disclosure claims priority of Chinese Patent Application No. 202222612592.5, filed on Sep. 30, 2022, the entire contents of which are hereby incorporated by reference in their entirety.

TECHNICAL FIELD

The present disclosure relates to field of assistive technology for electronic devices, and in particular to a foldable wireless charging stand.

BACKGROUND

With the continuous development of wireless charging technology, more and more electronic products are equipped with wireless charging function. In order to facilitate simultaneous wireless charging of different electronic products, such as simultaneous charging of electronic devices such as earphones, mobile phones, watches, etc., a three-in-one foldable wireless charging stand is designed in the related art. The entire wireless charging stand can be folded and unfolded by making the three wireless charging modules connected sequentially through an articulation structure. If the wireless charging modules of the three wireless charging modules are independent of each other, the overall cost will increase. If the wireless charging assemblies of the three wireless charging modules are electrically connected by wires, the wires at the connection of two neighboring wireless charging modules are often bent and easily damaged due to the need for frequent folding during use. In addition, the connection between the articulation structure and the wireless charging module is complicated and not easy to install.

The above content is only intended to assist in understanding the technical solution of the present disclosure, and does not mean to recognize the above content as prior art.

SUMMARY OF THE DISCLOSURE

In view of the above problems, the present disclosure proposes a foldable wireless charging bracket, which is designed to make the wires between two neighboring wireless charging modules not easy to be damaged and to reduce the difficulty of installation of the articulation structure on the wireless charging module.

To achieve the above objects, the present disclosure provides a foldable wireless charging stand, including: an articulation assembly and at least two wireless charging modules sequentially adjacent to each other; wherein two adjacent wireless charging modules of the at least two wireless charging modules are rotatably connected through the articulation assembly, and the two adjacent wireless charging modules are electrically connected through a wire; the articulation assembly includes an articulation sleeve and an articulation shaft rotatably disposed in the articulation sleeve; a mounting notch is defined on a peripheral edge of one of the two adjacent wireless charging modules, and a peripheral sidewall of the articulation sleeve is fixedly connected to the other of the two adjacent wireless charging modules and is disposed in the mounting notch; an end of the articulation sleeve defines a first opening, and the other end of the articulation sleeve defines a second opening; the peripheral sidewall, of the articulation sleeve, connected to the other of the two adjacent wireless charging modules defines a wire passage hole adjacent to the first opening; the articulation shaft has a rotation portion and a mounting lug protruding from an outer surface of the rotation portion; the rotation portion is rotatably embedded in the articulation sleeve through the second opening and is disposed avoiding the wire passage hole; the mounting lug is exposed to the second opening and fixedly connected to the one of the two adjacent wireless charging modules with the mounting notch; the wire is led from a sidewall of the mounting notch toward the first opening and is threaded sequentially through the first opening, an inner cavity of the articulation sleeve, and the wire passage hole into the other of the two adjacent wireless charging modules.

In some embodiments, a number of the at least two wireless charging modules is at least three, and a plurality of the articulation assemblies have a same axial direction.

In some embodiments, the at least two wireless charging modules include a first wireless charging module, a second wireless charging module, and a third wireless charging module sequentially adjacent to each other; the first wireless charging module is disposed on a side of the second wireless charging module, and the third wireless charging module 130 is disposed on another side of the second wireless charging module opposite to the side; the second wireless charging module has a first plate surface and a second plate surface that are opposite to each other; the mounting notch is defined on a peripheral edge of each of opposite sides of the second wireless charging module; the articulation sleeve includes two articulation sleeves, wherein a peripheral sidewall of one of the two articulation sleeves is fixedly connected to a plate surface of the first wireless charging module facing the first plate surface, and a peripheral sidewall of the other of the two articulation sleeves is fixedly connected to a plate surface of the third wireless charging module facing the second plate surface; the first plate surface or the second plate surface defines an alignment channel connecting the first openings of the two articulation sleeves.

In some embodiments, the one of the two adjacent wireless charging modules with the mounting notch further defines a limit slot in communication to the mounting notch; the mounting lug is embedded in the limit slot and sandwiched between two sidewalls of the limit slot.

In some embodiments, one or more apertures is defined on the mounting lug; the foldable wireless charging stand further includes a screw, the screw being threaded through each of the one or more apertures of the mounting lug and threadedly connected to the one of the two adjacent wireless charging modules.

In some embodiments, the one of the two adjacent wireless charging modules is in a form of a plate structure, and the limit slot is defined on a plate surface of the one of the two adjacent wireless charging modules.

In some embodiments, the articulation shaft includes a rotation cylinder and a connection shaft; the connection shaft includes a connection segment and the mounting lug that are integrally molded, the connection segment is fixedly embedded in the rotation cylinder, and the rotation cylinder forms the rotation portion.

In some embodiments, the mounting lug has two limiting wall surfaces that are opposite to each other, and each of the limiting wall surfaces is abutted against a corresponding one of the two sidewalls of the limit slot.

In some embodiments, the articulation sleeve includes a barrel, a connection tab, and a nesting tab; an end of the barrel defines the first opening, and the other end of the barrel defines the second opening; the connection tab is connected to a peripheral sidewall of the barrel, and the nesting tab is fixedly connected to an outer wall surface of the connection tab back away from the barrel; the nesting tab defines the wire passage hole, and the wire passage hole is in communication with an inner cavity of the barrel; the barrel is arranged at the mounting notch, and the nesting tab is embedded and fixedly connected to the other of the two adjacent wireless charging modules.

In some embodiments, the articulation sleeve further includes a connection ring; the connection ring is fixedly connected to an end face of the barrel defining the first opening and is arranged around the first opening; the connection ring is rotatably connected to the other of the two adjacent wireless charging modules.

In some embodiments, a retaining wall is arranged in the articulation sleeve, and the rotation portion is embedded in the articulation sleeve and abuts against the retaining wall.

In some embodiments, the wire passage hole is defined between the retaining wall and an end surface of the articulation sleeve defining the first opening.

In some embodiments, a distance between the wire passage hole and an end face of the articulation sleeve where the first opening is located is L1, and a distance between the wire passage hole and an end face of the articulation sleeve where the second opening is located is L2; 2L1<L2.

In some embodiments, each wireless charging module includes a board body and a wireless charging assembly disposed within the board body; the wireless charging assemblies of the at least two wireless charging modules are all electrically connected through the wire.

In some embodiments, the wire passage hole is dampenedly connected to the articulation sleeve.

In some embodiments, the first openings of the plurality of the articulation assemblies are located on a same side on their respective axis.

In the foldable wireless charging stand, two adjacent wireless charging modules are rotatably connected through one articulation assembly, and the two adjacent wireless charging modules are electrically connected through the wire; the mounting notch is defined on the peripheral edge of one of the two adjacent wireless charging modules, and the articulation sleeve is fixedly connected to the other of the two adjacent the wireless charging modules and is disposed matching with the mounting notch; an end of the articulation sleeve defines the first opening, and the other end of the articulation sleeve defines the second opening; the peripheral sidewall of the articulation sleeve defines the wire passage hole adjacent to the first opening, and the wire passes through the first opening and the wire passage hole; the rotation portion of the articulation shaft is rotatably embedded in the articulation sleeve through the second opening. In this way, one end of the articulation sleeve is used for mounting the articulation shaft, and the other end is used for threading the wire between the two adjacent wireless charging modules, making full use of both ends of the articulation sleeve. While realizing the rotational connection between the two adjacent wireless charging modules, the wire between the two adjacent wireless charging modules is hidden in the articulation sleeve, which makes the overall structure more reliable, and the wire can rotate synchronously with the articulation sleeve, which avoids the wire from being bent excessively when the wireless charging module is folded for many times, which in turn effectively avoids the wire from being damaged.

In addition, the mounting lug of the articulation shaft is exposed to the second opening and fixedly connected to the wireless charging module with the mounting notch. The articulation shaft is fixedly connected to the wireless charging module through the exposed mounting lug, which makes the connection between the articulation shaft and the wireless charging module more stable and convenient, and compared to a way in which two adjacent wireless charging modules are connected by flexible materials, the wireless charging module can be made to fold and hover to a desired position, which meets the user's demand for the use of different charging methods. Further, compared to a way of making the wireless charging module and the articulation assembly both divided into an upper part and a lower part to realize disassembly, the overall structure of the present disclosure is simplified, the difficulty of installing the articulation structure and the wireless charging module is effectively reduced, and the installation steps are reduced.

BRIEF DESCRIPTION OF THE DRAWINGS

In order to more clearly illustrate the technical solutions in the embodiments of the present disclosure, the accompanying drawings to be used in the description of the embodiments will be briefly introduced in the following. Obviously, the accompanying drawings in the following description are only some of the embodiments of the present disclosure, and for those skilled in the art, other accompanying drawings can be obtained based on these drawings without creative labor.

REFERENCE NUMERALS

| No. | Name |
|---|---|
| 100 | wireless charging module |
| 110 | first wireless charging module |
| 120 | second wireless charging module |
| 121 | mounting notch |
| 122 | first plate surface |
| 123 | second plate surface |

-continued

| No. | Name |
| --- | --- |
| 124 | limit slot |
| 125 | alignment channel |
| 130 | third wireless charging module |
| 140 | wireless charging assembly |
| 200 | articulation assembly |
| 210 | articulation sleeve |
| 211 | first opening |
| 212 | second opening |
| 213 | wire passage hole |
| 214 | barrel |
| 215 | connection tab |
| 216 | nesting tab |
| 217 | connection ring |
| 218 | retaining wall |
| 220 | articulation shaft |
| 221 | rotation cylinder |
| 222 | connection shaft |
| 223 | connection section |
| 224 | mounting lug |
| 225 | limiting wall surface |
| 300 | wire |

The realization of the purpose, functional features, and advantages of the present disclosure will be further described in conjunction with the embodiments and with reference to the accompanying drawings.

DETAILED DESCRIPTION

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure, and not all of the embodiments. Based on the embodiments in the present disclosure, all other embodiments obtained by those skilled in the art without creative labor fall within the scope of the present disclosure. In addition, the technical solutions between the various embodiments can be combined with each other, but it must be based on the fact that those skilled in the art are able to realize it, and when the combination of the technical solutions appears to be contradictory or unattainable, it should be considered that the combination of such technical solutions does not exist, and is not included in the scope claimed by the present disclosure.

It should be noted that when the embodiments of the present disclosure involve directional indications (such as up, down, left, right, forward, back), the directional indications are only intended to explain the relative positional relationship between the various components, the movement, etc., in a particular attitude. When the particular attitude changes, the directional indications are also changed accordingly.

In addition, when the embodiments of the present disclosure contain descriptions involving "first", "second", etc., the descriptions of "first", "second", etc. are intended only for explaining the relative positional relationship between the parts in a particular attitude. The descriptions of "first", "second", etc. are only for descriptive purposes, and are not to be construed as indicating or implying their relative importance or implicitly specifying the number of the indicated technical features. As a result, a feature defined as "first" or "second" may include at least one such feature either explicitly or implicitly. In addition, the meaning of "and/or" in the whole text is to include three concurrent solutions, and "A and/or B", for example, includes solution A, solution B, or a solution in which both A and B are met at the same time.

The present disclosure proposes a foldable wireless charging stand.

In the embodiments of the present disclosure, referring to FIGS. 1 to 5 and 9, the foldable wireless charging stand includes an articulation assembly 200 and at least two wireless charging modules 100 sequentially adjacent to each other, where the two adjacent wireless charging modules 100 are rotatably connected through the articulation assembly 200, and the two adjacent wireless charging modules 100 are electrically connected through a wire 300.

The articulation assembly 200 includes an articulation sleeve 210 and an articulation shaft 220 rotatably disposed in the articulation sleeve 210; a mounting notch 121 is defined on a peripheral edge of one of the two adjacent wireless charging modules 100, and the articulation sleeve 210 is fixedly connected to the other of the two adjacent wireless charging modules 100 and is disposed matching with the mounting notch 121.

An end of the articulation sleeve 210 defines a first opening 211, and the other end of the articulation sleeve 210 defines a second opening 212; a peripheral sidewall of the articulation sleeve 210 defines a wire passage hole 213 adjacent to the first opening 211; the articulation shaft 220 is arranged with a rotation portion and a mounting lug 224 protruding from an outer surface of the rotation portion; the rotation portion is rotatably embedded in the articulation sleeve 210 through the second opening 212, and the mounting lug 224 is exposed to the second opening 212 and fixedly connected to the wireless charging module 100 with the mounting notch 121; the wire 300 passes through the first opening 211 and the wire passage hole 213.

In the embodiments, the number of the wireless charging modules 100 may be selected and designed according to actual needs, for example, the number of the wireless charging modules 100 may be two, three, four, five, etc., and is not specifically limited herein. In order to facilitate the placement of electronic products, the wireless charging module 100 is set in a plate shape as a whole. An outer contour shape of the wireless charging module 100 may be substantially rectangular, or may be set as a circle, an oval, a heart, etc. The shapes of the wireless charging modules 100 may be the same, or may be different, and there is no specific limitation on the outer contour shape of the wireless charging module 100 herein.

The two adjacent wireless charging modules 100 are rotatably connected through one articulation assembly 200, then the number of the articulation assemblies 200 is one less than the number of the multiple wireless charging modules 100. In this way, the multiple wireless charging modules 100 are adjacent to each other in sequence, and when the number of the wireless charging modules 100 is greater than three and the entire foldable wireless charging stand is in an unfolded state, the multiple wireless charging modules 100 may be arranged in a straight line, i.e., the extension directions of rotation axes of the multiple articulation assemblies 200 are consistent. In other embodiments, when the entire foldable wireless charging stand is in the unfolded state, the multiple wireless charging modules 100 may be arranged in a folded line, for example, in an overall L-shape or the like, such that the extension directions of the rotation axes of the at least two articulation assemblies 200 are intersecting or perpendicular to each other. The arrangement of the multiple wireless charging modules 100 may be selected and designed according to actual needs, and is not specifically limited herein. The foldable wireless charging stand can switch between the folded state, the unfolded state, and the stand state according to the user's usage needs, and the user can adjust the angle between two adjacent wireless charging modules 100 in order to bend the entire foldable wireless charging stand to a desired angle.

It is to be understood that each wireless charging module 100 includes a board body and a wireless charging assembly 140 disposed within the board body. The wireless charging assembly 140 includes a circuit board and a coil assembly, the coil assembly is connected to the circuit board through the wire 300, and the circuit board provides a power supply to the coil assembly to wirelessly charge electronic devices such as mobile phone, earphones, watch, etc. by the coil assembly. The wireless charging assemblies 140 of the multiple wireless charging modules 100 are all electrically connected through the wires 300. Specifically, a power interface electrically connected to the circuit board may be arranged on one of the wireless charging modules 100 to enable the entire foldable wireless charging stand to be electrically connected to an external power source through the power interface. The specific structure of the coil assembly and the circuit board may refer to the existing structure, for example, the coil assembly may specifically include a transmitting coil and a receiving coil to generate a magnetic induction current through a magnetic induction phenomenon to charge a rechargeable battery of the electronic device. Typically, in order to be aesthetically pleasing and to prevent accidental touching, the wireless charging module 100 further includes a cover plate to cover a position of the board body where the wireless charging assembly 140 is arranged, and thus to ensure consistency in the appearance of the entire module.

The shape of the mounting notch 121 is adapted to the shape of the articulation sleeve 210. The articulation sleeve 210 may be fixedly connected to the wireless charging module 100 by welding, screws, or the like. It is to be understood that in order to make the rotation angle of the wireless charging module 100 larger and to avoid interference when two adjacent wireless charging modules 100 are rotated, in some embodiments, the articulation sleeve 210 is fixedly connected to a position of the wireless charging module 100 adjacent to the peripheral edge. A middle portion of the articulation sleeve 210 is hollowed out such that the first opening 211 and the second opening 212 are defined at each end of the articulation sleeve 210, and the first opening 211 and the second opening 212 are in communication to an inner cavity of the articulation sleeve 210. The peripheral sidewall of the articulation sleeve 210 defines the wire passage hole 213 adjacent to the first opening 211, and the wire passage hole 213 is in communication to the inner cavity of the articulation sleeve 210 and the first opening 211. Specifically, a distance between the wire passage hole 213 and an end face of the articulation sleeve 210 where the first opening 211 is located is L1, and the distance between the wire passage hole 213 and an end face of the articulation sleeve where the second opening 212 is located is L2, 2L1<L2. In this way, the wire passage hole 213 is located as close as possible to an edge of the first opening 211, and the length of the rotation portion of the articulation shaft 220 that can be extended into the articulation sleeve 210 is longer, which may improve the rotational stability between the articulation shaft 220 and the articulation sleeve 210.

The wire 300 on one of the wireless charging modules 100 may be connected to the wireless charging assembly 140 of another wireless charging module 100 through the first opening 211, the inner cavity of the articulation sleeve 210, and the wire passage hole 213 sequentially, such that the wire 300 at the connection of the two adjacent wireless charging modules 100 may be hidden inside the articulation sleeve 210 and rotate in synchronization with the articulation sleeve 210, which may avoid damage to the wire 300 at the connection of the two adjacent wireless charging modules 100 due to multiple bending.

The articulation shaft 220 includes the rotation portion and the mounting lug 224 protruding from the outer surface of the rotation portion. The rotation portion and the mounting lug 224 may be set up as a single unit, or in separate moldings, as long as the rotation portion and the mounting lug 224 can be fixedly connected. The length and width of the mounting lug 224 may be selected and designed according to the demand for connection strength. Specifically, one or more apertures may be defined on the mounting lug 224, and during installation, screws are threaded through the apertures of the mounting lug 224 and threaded with the wireless charging module 100 to realize a fixed connection between the mounting lug 224 and the wireless charging module 100. In order to realize a folded hovering between the adjacent two wireless charging modules 100, a damping sleeve, a damping oil, etc. may be arranged between the rotation portion and the articulation sleeve 210 to increase the rotational resistance between the two, so as to make the wireless charging module 100 rotatable and hovering to any position. In this way, the foldable wireless charging stand has a stand state, in which the electronic device will not swing randomly when placed on the hovering wireless charging module 100, thereby meeting the different usage needs of users.

In the foldable wireless charging stand, two adjacent wireless charging modules 100 are rotatably connected through one articulation assembly 200, and the two adjacent wireless charging modules 100 are electrically connected through the wire 300; the mounting notch 121 is defined on the peripheral edge of one of the two adjacent wireless charging modules 100, and the articulation sleeve 210 is fixedly connected to the other of the two adjacent wireless charging modules 100 and is disposed matching with the mounting notch 121; an end of the articulation sleeve 210 defines the first opening 211, and the other end of the articulation sleeve 210 defines the second opening 212; the peripheral sidewall of the articulation sleeve 210 defines the wire passage hole 213 adjacent to the first opening 211, and the wire 300 passes through the first opening 211 and the wire passage hole 213; the rotation portion of the articulation shaft 220 is rotatably embedded in the articulation sleeve 210 through the second opening 212. In this way, one end of the articulation sleeve 210 is used for mounting the articulation shaft 220, and the other end is used for threading the wire 300 between the two adjacent wireless charging modules 100, making full use of both ends of the articulation sleeve 210. While realizing the rotational connection between the two adjacent wireless charging modules 100, the wire 300 between the two adjacent wireless charging modules is hidden in the articulation sleeve 210, which makes the overall structure more reliable, and the wire 300 can rotate synchronously with the articulation sleeve 210, which avoids the wire 300 from being bent excessively when the wireless charging module 100 is folded for many times, which in turn effectively avoids the wire 300 from being damaged.

In addition, the mounting lug 224 of the articulation shaft 220 is exposed to the second opening 212 and fixedly connected to the wireless charging module 100 with the mounting notch 121. The articulation shaft 220 is fixedly connected to the wireless charging module 100 through the exposed mounting lug 224, which makes the connection between the articulation shaft 220 and the wireless charging module 100 more stable and convenient, and compared to a way in which two adjacent wireless charging modules 100 are connected by flexible materials, the wireless charging module 100 can be made to fold and hover to a desired position, which meets the user's demand for the use of different charging methods. Further, compared to a way of making the wireless charging module 100 and the articulation assembly 200 both divided into an upper part and a lower part to realize disassembly, the overall structure of the present disclosure is simplified, the difficulty of installing the articulation structure and the wireless charging module is effectively reduced, and the installation steps are reduced.

In some embodiments, as shown in FIGS. 2 to 6, the number of the wireless charging modules 100 is at least three, and the multiple articulation assemblies 200 have the same axial direction.

In the embodiments, the axial directions of the multiple the articulation assemblies 200 are the same, and the axial directions of the multiple articulation assemblies 200 may be perfectly parallel or may have an angular deviation of not more than 5 degrees. In this way, the multiple wireless charging modules 100 are arranged in a substantially straight line when the foldable wireless charging stand is in the unfolded position. Compared to a structure in which the axial directions of the multiple articulation assemblies 200 are not aligned, the length of the entire foldable wireless charging stand can be increased. In this way, the wireless charging module 100 at the very end may be used as a base, the remaining wireless charging modules 100 may form a pillar structure, and the entire foldable wireless charging stand may be used as an electronic device stand capable of supporting an electronic device, so as to satisfy the different usage needs of the user.

It is to be understood that the first openings 211 of the multiple the articulation assemblies 200 may be located on the same side on their axes or on different sides. In some embodiments, the first openings 211 of the multiple the articulation assemblies 200 are located on the same side on their axes. The axes of the multiple the articulation assemblies 200 are oriented in the same direction while the first openings 211 of the multiple the articulation assemblies 200 are located on the same side on their axes, such that the wires 300 connecting the multiple wireless charging modules 100 are all led in or out from the same side of the multiple wireless charging modules 100. In this way, the overall length of the wire 300 may be effectively reduced, and the overall alignment is more concise.

Figure 7:
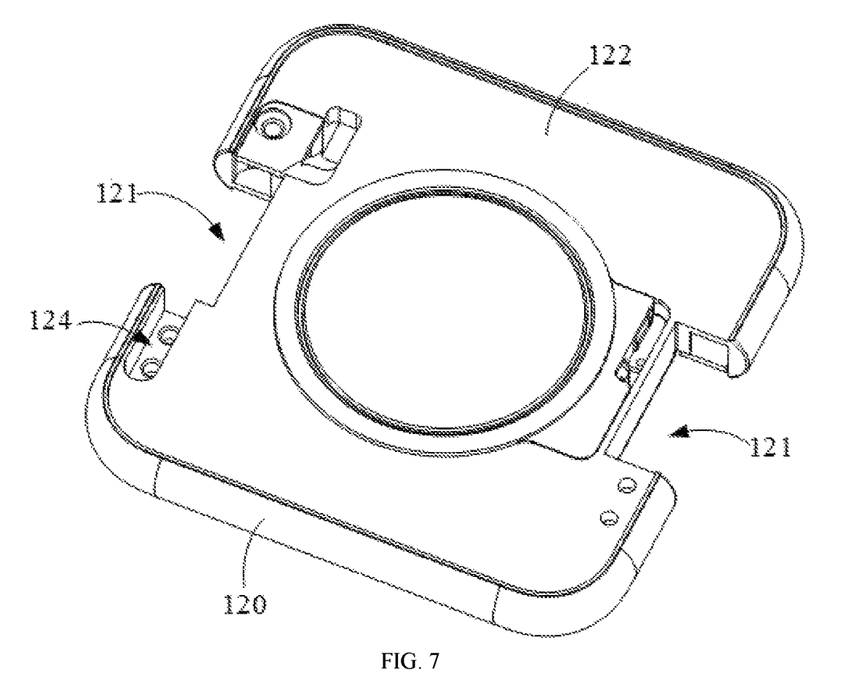
FIG. 7 is a schematic view of a front structure of a second wireless charging module in FIG. 3.
Figure 8:
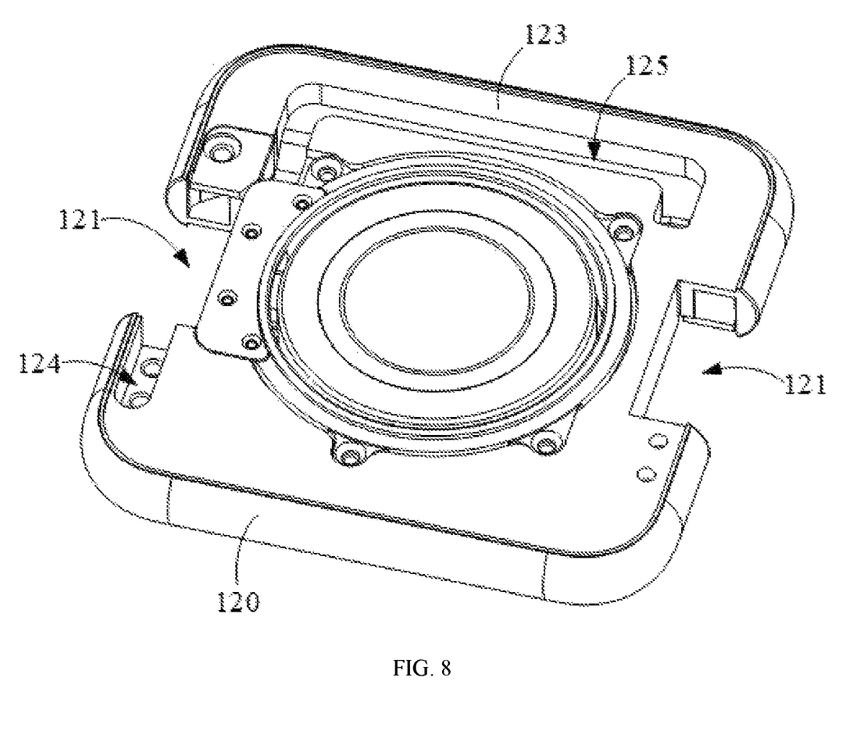
FIG. 8 is a schematic view of a rear structure of the second wireless charging module in FIG. 7.
Figure 11:
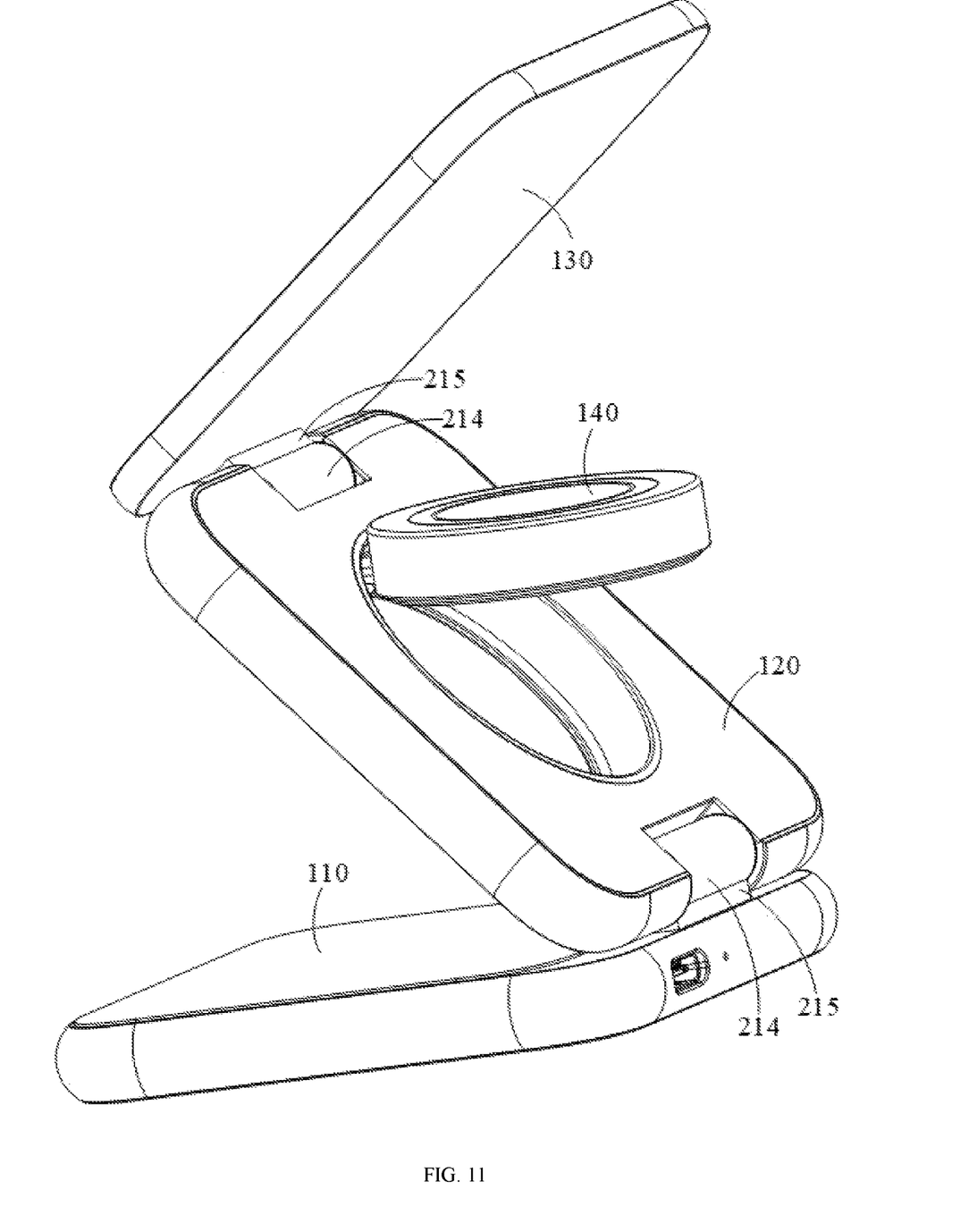
FIG. 11 is a structural schematic view of a foldable wireless charging stand in a folded state according to another embodiment of the present disclosure.

Further, referring to FIGS. 7, 8, and 11 together, the multiple wireless charging modules 100 include a first wireless charging module 110, a second wireless charging module 120, and a third wireless charging module 130 sequentially adjacent to each other; the first wireless charging module 110 is disposed on a side of the second wireless charging module 120, and the third wireless charging module 130 is disposed on another side of the second wireless charging module 120 opposite to the side.

The second wireless charging module 120 has a first plate surface 122 and a second plate surface 123 that are opposite to each other; the mounting notch 121 is defined on a peripheral edge of each of opposite sides of the second wireless charging module 120, where one articulation sleeve 210 is fixedly connected to a plate surface of the first wireless charging module 110 facing the first plate surface 122, and another articulation sleeve 210 is fixedly connected to a plate surface of the third wireless charging module 130 facing the second plate surface 123; the first plate surface 122 or the second plate surface 123 defines an alignment channel 125 connecting the first openings 211 of the two articulation sleeves 210.

In the embodiments, the first wireless charging module 110 and the third wireless charging module 130 are arranged on the plate surfaces on both sides of the second wireless charging module 120, one articulation sleeve 210 is fixedly connected to the plate surface of the first wireless charging module 110 facing the first plate surface 122, and another the articulation sleeve 210 is fixedly connected to the plate surface of the third wireless charging module 130 facing the second plate surface 123, such that when the foldable wireless charging stand is being folded, the first wireless charging module 110 and the third wireless charging module 130 can be folded to fit the second plate surface 123 and the first plate surface 122 of the second wireless charging module 120, respectively. In this way, the height of the foldable wireless charging stand is minimized, making it more convenient for users to store and carry and more conducive to adjusting the entire foldable wireless charging stand to the stand state (as shown in FIG. 11).

In order to facilitate charging, the wireless charging assembly 140 of the second wireless charging module 120 may be rotatably connected to a housing of the second wireless charging module 120 around a horizontal axis. The first wireless charging module 110 serves as a base and the third wireless charging module 130 serves as a tray for the electronic device, and a magnetic ring may be arranged within the third wireless charging module 130. In this way, when the foldable wireless charging stand is adjusted to the stand state, the first wireless charging module 110 located at the bottom may be used for wireless charging of earphones, and the wireless charging module 140 on the second wireless charging module 120 may be flipped to a horizontal state to wirelessly charge electronic devices such as a watch; and electronic devices such as a mobile phone may be magnetically sucked to the third wireless charging module 130 for wireless charging. In this way, three-in-one wireless charging may be realized, which greatly facilitates the use of the user.

It is to be noted that in order to ensure the hovering reliability between two adjacent wireless charging modules 100, there are certain requirements for the cross-sectional dimension of the articulation sleeve 210. Correspondingly, the wireless charging module 100 with the mounting notch 121 is made to have a higher required structural strength, and the overall thickness is larger. By defining the mounting notch 121 on each of the opposite peripheral edges of the wireless charging module 100 for connecting the articulation assemblies 200 of the first wireless charging module 110 and the third wireless charging module 130, only the thickness of the second wireless charging module 120 is required to be increased. In this way, the overall thickness of the first wireless charging module 110 and the third wireless charging module 130 may be set thinner and lighter, which makes the weight of the entire foldable wireless charging stand lighter, and the whole is more compact and lightweight after being folded.

By defining the alignment channel 125 connecting the first openings 211 of the two articulation sleeves 210 on the first plate surface 122 or the second plate surface 123, the wires 300 of the first wireless charging module 110 and the third wireless charging module 130 through the second wireless charging module 120 are embedded in the alignment channel 125, such that the alignment of the entire folded wireless charging module is shorter, and the overall alignment is more organized and concise.

In some embodiments, as shown in FIGS. 3 to 8, the wireless charging module 100 with the mounting notch 121 further defines a limit slot 124 in communication to the mounting notch 121; the mounting lug 224 is embedded in the limit slot 124 and sandwiched between two sidewalls of the limit slot 124. By defining the limit slot 124 on the wireless charging module 100 in communication with the mounting notch 121, the mounting lug 224 is arranged in the limit slot 124 in a positionally limited manner. Compared to directly attaching the mounting lug 224 to the plate surface of the wireless charging module 100, the cooperation between the mounting lug 224 and the limit slot 124 realizes a pre-positioned mounting, so as to make the connection of the entire articulation assembly 200 on the wireless charging module 100 more convenient and easier. In addition, compared to directly attaching the mounting lug 224 to the plate surface of the wireless charging module 100, the present embodiments make the mounting lug 224 and the articulation sleeve 210 substantially coaxially disposed, so as to reduce or avoid the torque on the mounting lug 224 when the wireless charging module 100 is rotating, and thus ensure the structural strength of the entire articulation shaft 220 and avoid damage thereto.

Further, the wireless charging module 100 is in the form of a plate structure, and the limit slot 124 is defined on the plate surface of the wireless charging module 100. By defining the limit slot 124 on the plate surface of the wireless charging module 100, the width of the limit slot 124 may be set larger compared to defining the limit slot 124 on the sidewall of the wireless charging module 100, and correspondingly, the width of the mounting lug 224 may be set larger, which makes the connection between the articulation shaft 220 and the wireless charging module 100 more stable and reliable, and reduces the impact on the structural strength of the wireless charging module 100, thereby improving the service life of the product. In other embodiments, it is possible to define the limit slot 124 on the peripheral sidewall of the wireless charging module 100.

Figure 1:
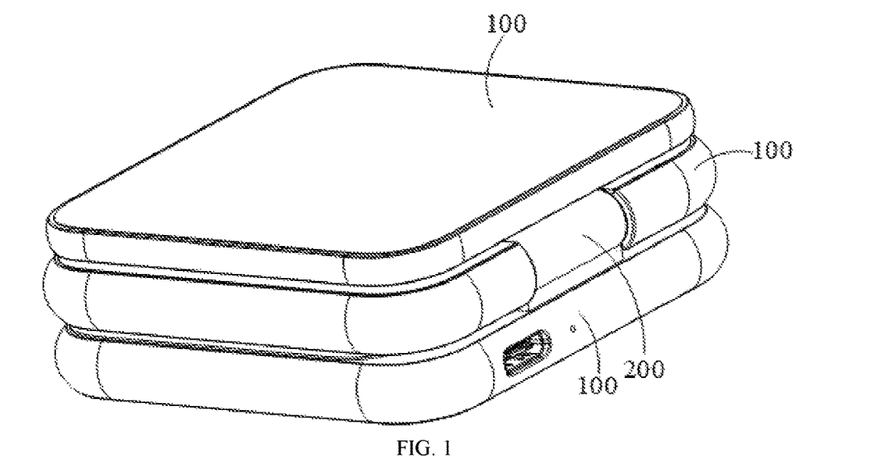
FIG. 1 is a structural schematic view of a foldable wireless charging stand in a folded state according to an embodiment of the present disclosure.
Figure 2:
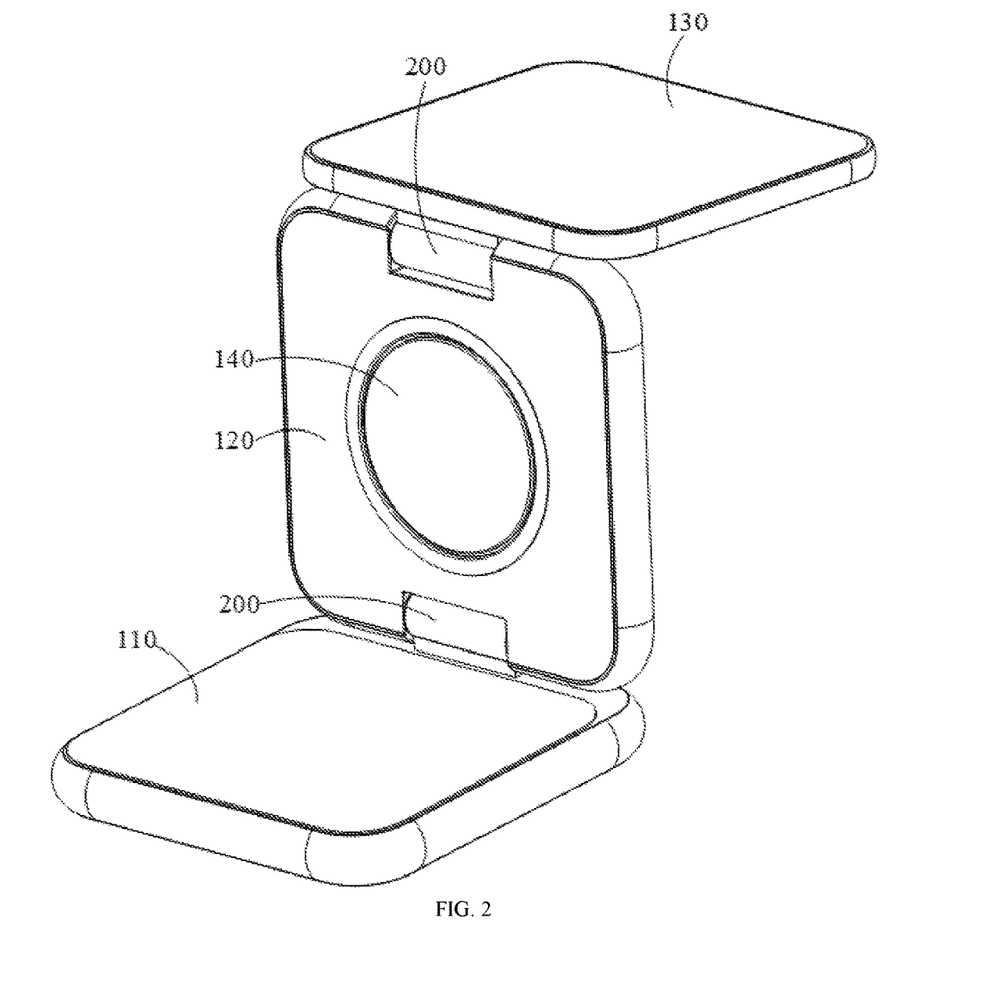
FIG. 2 is a structural schematic view of the foldable wireless charging stand in FIG. 1 in a stand state.
Figure 3:
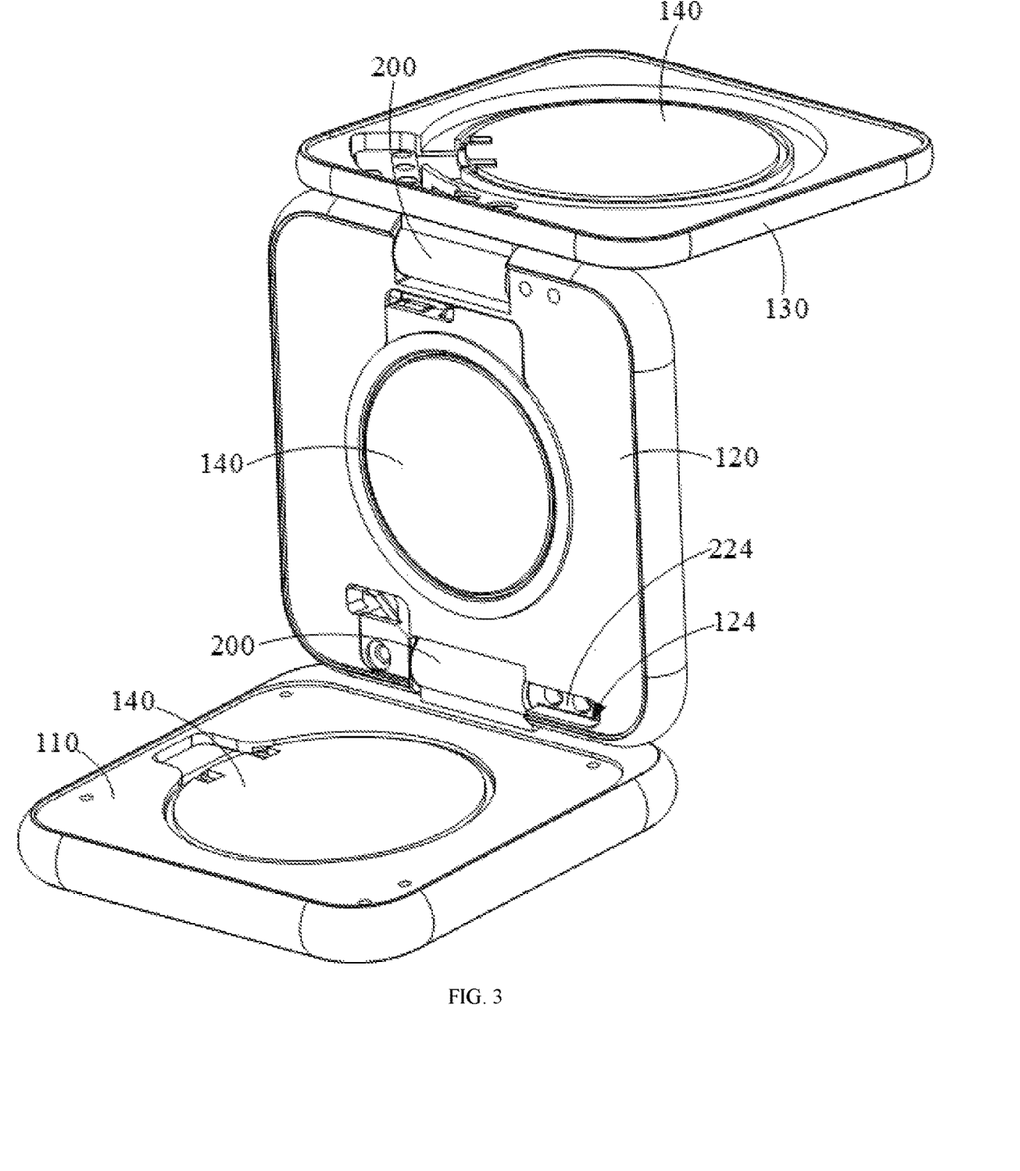
FIG. 3 is a structural schematic view after a cover plate of a wireless charging module in FIG. 2 is removed.
Figure 4:
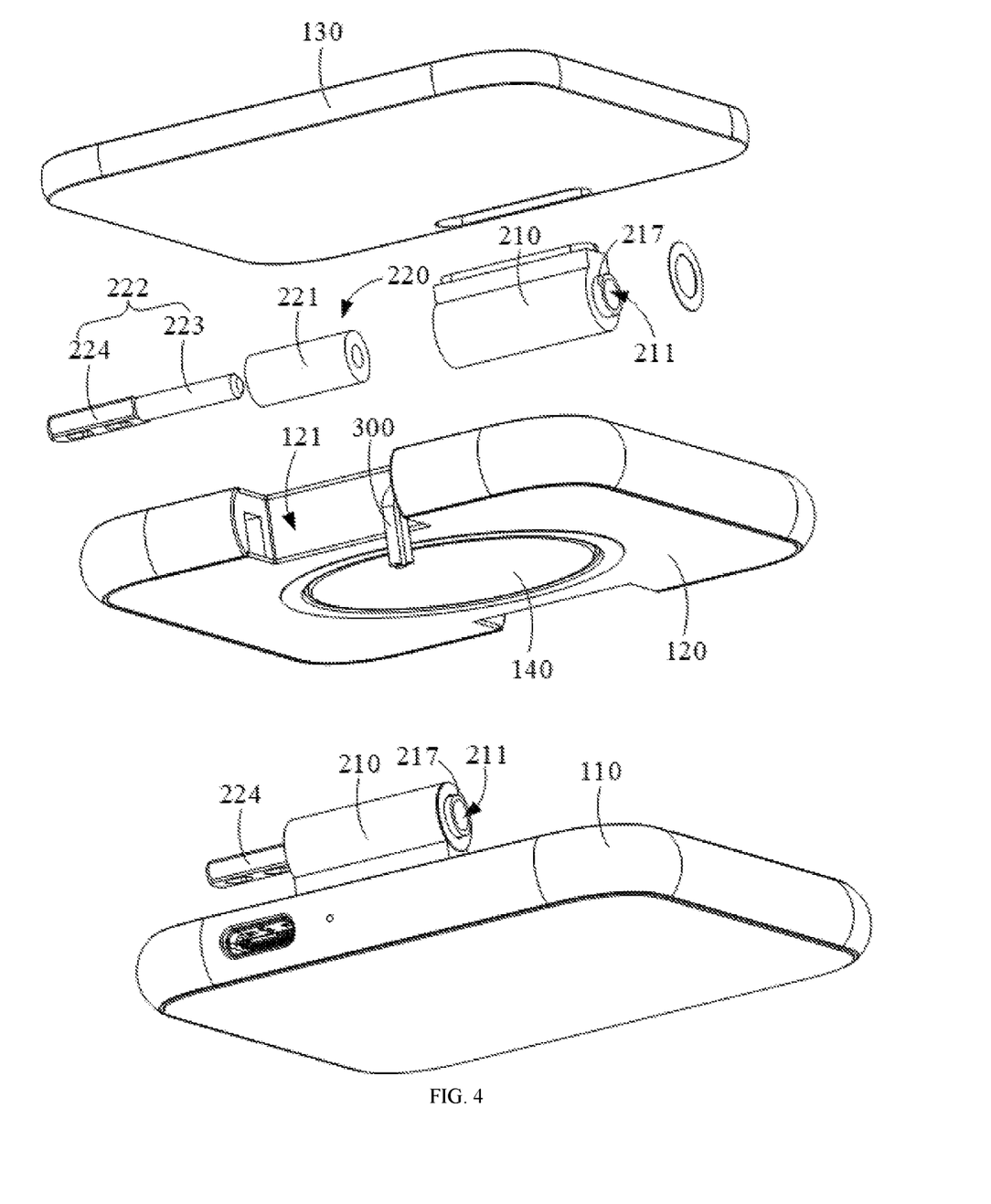
FIG. 4 is a schematic view of a partially decomposed structure of the foldable wireless charging stand in FIG. 1.
Figure 5:
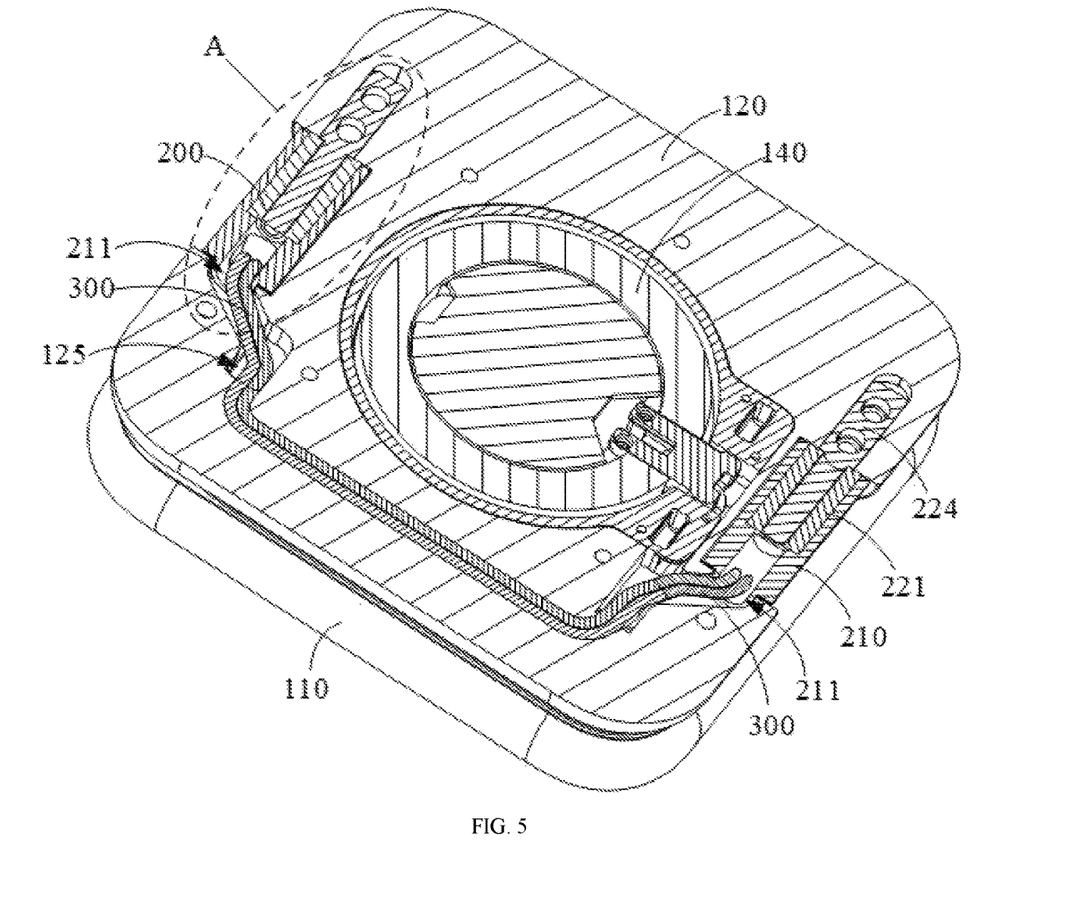
FIG. 5 is a cross-sectional view of the foldable wireless charging stand in FIG. 4 in a viewing angle.
Figure 6:
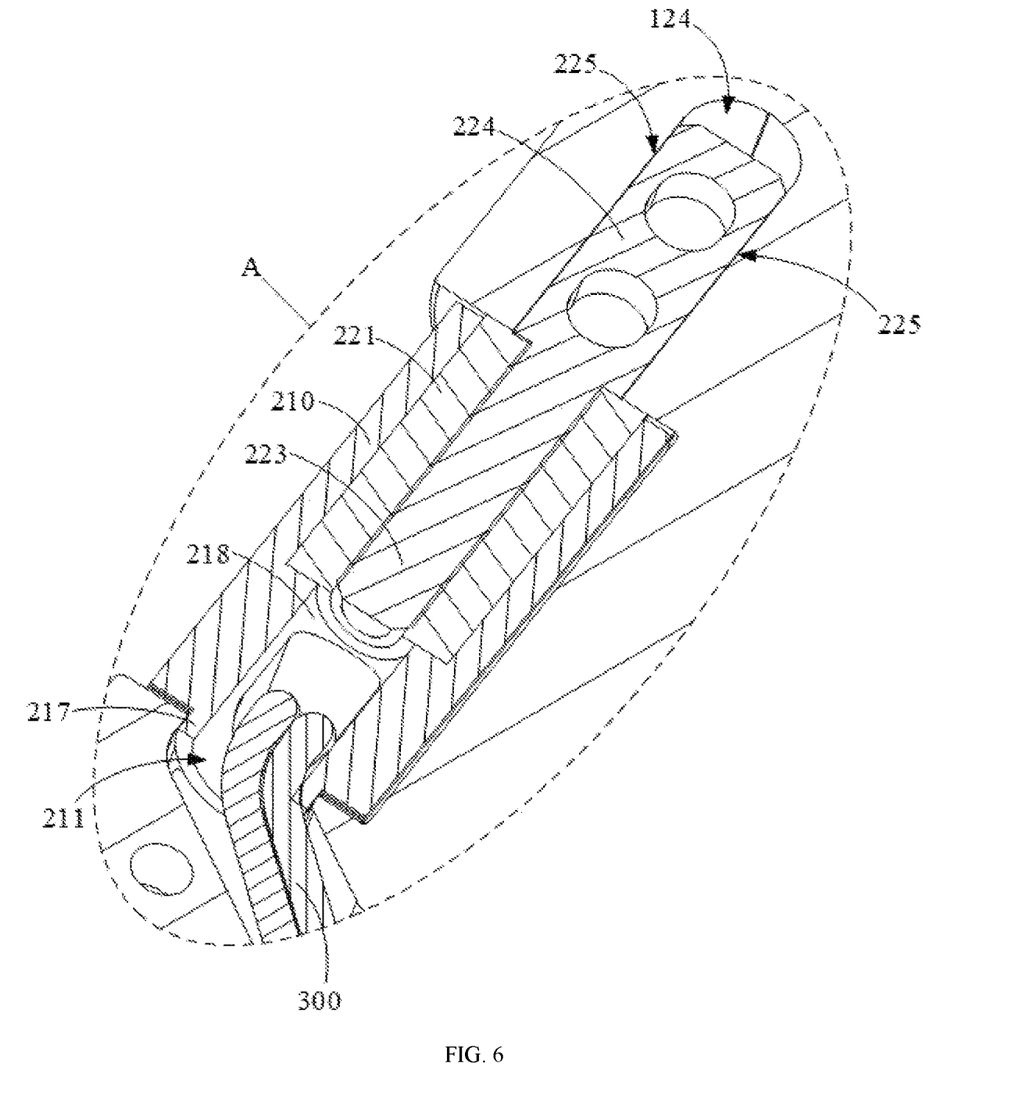
FIG. 6 is a partially enlarged view at A in FIG. 5.

In some embodiments, referring to FIGS. 4 to 6, the articulation shaft 220 includes a rotation cylinder 221 and a connection shaft 222; the connection shaft 222 includes a connection segment 223 and the mounting lug 224 that are integrally molded, the connection segment 223 is fixedly embedded in the rotation cylinder 221, and the rotation cylinder 221 forms the rotation portion.

In the embodiments, by making the articulation shaft 220 include the rotation cylinder 221 and the connection shaft 222, and the connection shaft 222 include the integrally molded connection segment 223 and mounting lug 224, the mounting lug 224 and the rotation cylinder 221 are divided into two structures. In this way, the two structures may be made of different materials according to the actual needs, for example, the entire connection shaft 222 may be made of high-strength steel material, and the rotation cylinder 221 may be made of materials such as stainless steel with a high wear-resistant coefficient. In addition, by making the connection shaft 222 include structures connection segment 223 and structures mounting lug 224, the mounting lug 224 is fixedly connected to the rotation cylinder 221 through the connection segment 223, compared to fixing the mounting lug 224 directly to an end of the rotation cylinder 221, the proposed design may avoid fracture of the connection between the mounting lug 224 and the rotation cylinder 221 due to excessive torsion, thereby making the entire articulation shaft 220 of higher structural strength and torsion resistance, and thus ensuring the reliability of the entire product. The connection section 223 may be a cylindrical structure, and in order to ensure the solidity of the connection between the connecting section 223 and the rotation cylinder 221, in some embodiments, the connection section 223 and the rotation cylinder 221 have an interference fit. By making the connection segment 223 and the mounting lug 224 integrally molded, the connection strength of the two may be ensured.

Further, referring again to FIGS. 4 to 6, the mounting lug 224 has two limiting wall surfaces 225 that are opposite to each other, and each of the limiting wall surfaces 225 is abutted against a corresponding one of the two sidewalls of the limit slot 124. By making the mounting lug 224 have two opposing limiting wall surfaces 225, the mounting lug 224 as a whole may have a plate-like structure, e.g., the cross-section of the mounting lug 224 may be set in a rectangular shape. In this way, the opposing limiting wall surfaces 225 of the mounting lug 224 are made to resist the two sidewalls of the limit slot 124, such that during pre-installation, the limiting wall surfaces 225 of the mounting lug 224 cooperate with the two sidewalls of the limit slot 124 in a positionally limited manner. Thereby even if the mounting lug 224 is not screwed, the wireless charging module 100 fixedly connected to the articulation sleeve 210 can rotate with respect to the wireless charging module 100 with the mounting notch 121, and the mounting lug 224 may be prevented from swaying within the limit slot 124, which in turn allows for better pre-positioned mounting of the mounting lug 224 and the limit slot 124.

Figure 9:
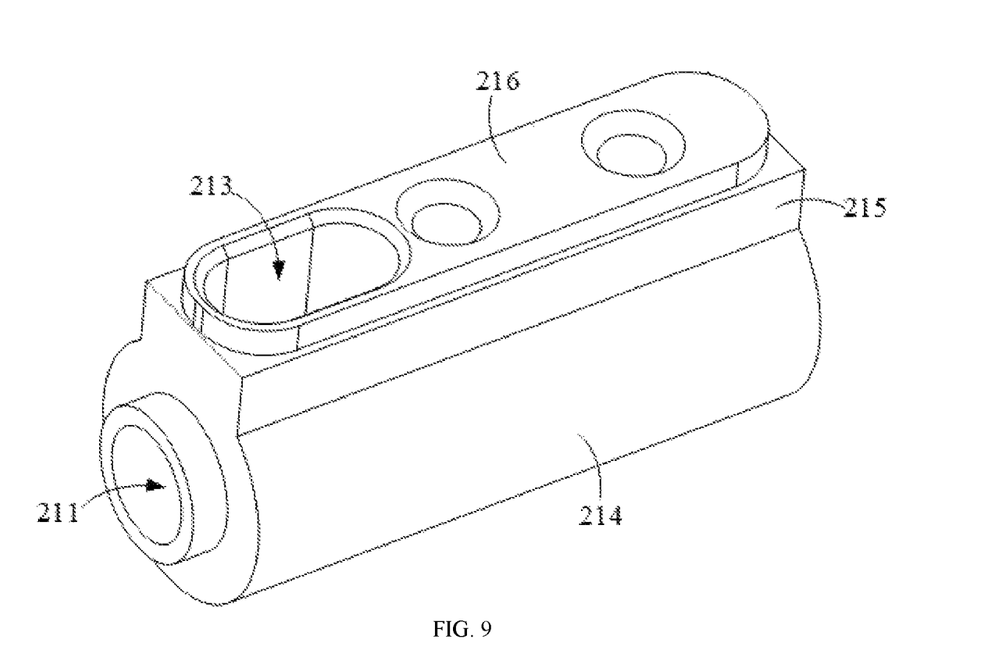
FIG. 9 is a structural schematic view of an articulation sleeve according to an embodiment of the present disclosure.
Figure 10:
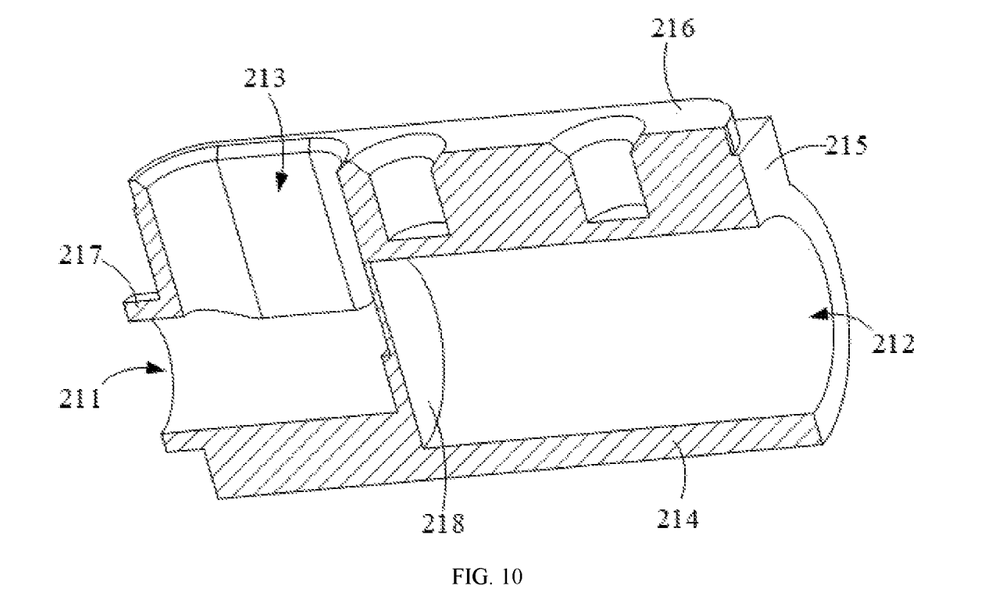
FIG. 10 is a cross-sectional view of the articulation sleeve in FIG. 9 in a viewing angle.

In some embodiments, as shown in FIGS. 9 to 11, the articulation sleeve 210 includes a barrel 214, a connection tab 215, and a nesting tab 216; an end of the barrel 214 defines the first opening 211, and the other end of the barrel 214 defines the second opening 21; the connection tab 215 is connected to a peripheral sidewall of the barrel 214, and the nesting tab 216 is fixedly connected to an outer wall surface of the connection tab 215 back away from the barrel 214; the nesting tab 216 defines the wire passage hole 213; the barrel 214 is arranged at the mounting notch 121, and the nesting tab 216 is embedded and fixedly connected to the wireless charging module 100.

In some embodiments, in order to ensure the connection strength, the barrel 214, the connection tab 215, and the nesting tab 216 are integrally molded. The nesting tab 216 is embedded in the plate surface of the wireless charging module 100, and the nesting tab 216 and the wireless charging module 100 may be fixedly connected by screws. By arranging the nesting tab 216, the pre-positioning of the articulation sleeve 210 and the wireless charging module 100 may be realized, so as to make the connection between the articulation sleeve 210 and the wireless charging module 100 more convenient and stable. By arranging the connection tab 215 on a sidewall of the cylinder 214, the connection tab 215 is arranged at a rotation gap between the two adjacent wireless charging modules 100, such that the two adjacent wireless charging modules 100 can be rotated to a state in which the plate surfaces fit together. By defining the wire passage hole 213 in the nesting tab 216, the impact of hole opening on the structural strength of the barrel 214 may be reduced; in addition, the wire 300 may be directly led into the wireless charging module 100, thereby avoiding the wire 300 from being exposed, and thus ensuring the consistency of the overall appearance.

Further, as shown in FIGS. 4 to 6, 9, and 10, the articulation sleeve 210 further includes a connection ring 217; the connection ring 217 is fixedly connected to an end face of the barrel 214 defining the first opening 211 and is arranged around the first opening 211; the connection ring 217 is rotatably connected to the wireless charging module 100. In order to ensure the strength of the connection, the connection ring 217 and the barrel 214 may be integrally molded. By arranging the connection ring 217 at the end face with the first opening 211 of the cylinder 214, the two ends of the articulation sleeve 210 are connected to the wireless charging module 100 through the connection ring 217 and the mounting lug 224 of the articulation shaft 220, respectively, such that the articulation sleeve 210 rotates more reliably with respect to the wireless charging module 100, avoiding the phenomenon of rotational displacement.

In some embodiments, as shown in FIGS. 6 and 10, a retaining wall 218 is arranged in the articulation sleeve 210, and the rotation portion is embedded in the articulation sleeve 210 and abuts against the retaining wall 218. By arranging the retaining wall 218, the embedding of the rotation portion in the articulation sleeve 210 may be positionally limited, thereby avoiding the rotation portion from being mounted over a predetermined position inside the articulation sleeve 210. Moreover, the retaining wall 218 may block the rotation portion and the wire 300, which may prevent the rotation portion from interfering with the wire 300 in the articulation sleeve 210. Specifically, the wire passage hole 213 is defined between the retaining wall 218 and an end surface of the articulation sleeve 210 defining the first opening 211. In this way, an end of the articulation sleeve 210 is used for mounting the articulation shaft 220, and the other end is used for threading the wire 300 between the two adjacent wireless charging modules 100.

Finally, it should be noted that the above embodiments are only intended to illustrate the technical solutions of the present disclosure, not to limit them; although the present disclosure is described in detail with reference to the foregoing embodiments, those skilled in the art should understand that it is still possible to modify the technical solutions recorded in the foregoing embodiments, or to replace some of the technical features therein with the same; and such modifications or replacements do not cause the essence of the technical solutions to depart from the spirit and scope of the technical solutions of the embodiments of the present disclosure.

What is claimed is:

1. A foldable wireless charging stand, comprising: an articulation assembly and at least two wireless charging modules sequentially adjacent to each other; wherein two adjacent wireless charging modules of the at least two wireless charging modules are rotatably connected through the articulation assembly, and the two adjacent wireless charging modules are electrically connected through a wire;

the articulation assembly comprises an articulation sleeve and an articulation shaft rotatably disposed in the articulation sleeve; a mounting notch is defined on a peripheral edge of one of the two adjacent wireless charging modules, and a peripheral sidewall of the articulation sleeve is fixedly connected to the other of the two adjacent wireless charging modules and is disposed in the mounting notch;

an end of the articulation sleeve defines a first opening, and the other end of the articulation sleeve defines a second opening; the peripheral sidewall, of the articulation sleeve, connected to the other of the two adjacent wireless charging modules defines a wire passage hole adjacent to the first opening; the articulation shaft has a rotation portion and a mounting lug protruding from an outer surface of the rotation portion; the rotation portion is rotatably embedded in the articulation sleeve through the second opening and is disposed avoiding the wire passage hole; the mounting lug is exposed to the second opening and fixedly connected to the one of the two adjacent wireless charging modules with the mounting notch; the wire is led from a sidewall of the mounting notch toward the first opening and is threaded sequentially through the first opening, an inner cavity of the articulation sleeve, and the wire passage hole into the other of the two adjacent wireless charging modules.

2. The foldable wireless charging stand according to claim 1, wherein a number of the at least two wireless charging modules is at least three, and a plurality of the articulation assemblies have a same axial direction.

3. The foldable wireless charging stand according to claim 2, wherein the at least two wireless charging modules comprise a first wireless charging module, a second wireless charging module, and a third wireless charging module sequentially adjacent to each other; the first wireless charging module is disposed on a side of the second wireless charging module, and the third wireless charging module is disposed on another side of the second wireless charging module opposite to the side;

the second wireless charging module has a first plate surface and a second plate surface that are opposite to each other; the mounting notch is defined on a peripheral edge of each of opposite sides of the second wireless charging module; the articulation sleeve comprises two articulation sleeves, wherein a peripheral sidewall of one of the two articulation sleeves is fixedly connected to a plate surface of the first wireless charging module facing the first plate surface, and a peripheral sidewall of the other of the two articulation sleeves is fixedly connected to a plate surface of the third wireless charging module facing the second plate surface; the first plate surface or the second plate surface defines an alignment channel connecting the first openings of the two articulation sleeves.

4. The foldable wireless charging stand according to claim 1, wherein the one of the two adjacent wireless charging modules with the mounting notch further defines a limit slot in communication to the mounting notch; the mounting lug is embedded in the limit slot and sandwiched between two sidewalls of the limit slot.

5. The foldable wireless charging stand according to claim 4, wherein one or more apertures is defined on the mounting lug; the foldable wireless charging stand further comprises a screw, the screw being threaded through each of the one or more apertures of the mounting lug and threadedly connected to the one of the two adjacent wireless charging modules.

6. The foldable wireless charging stand according to claim 3, wherein the one of the two adjacent wireless charging modules with the mounting notch further defines a limit slot in communication to the mounting notch; the mounting lug is embedded in the limit slot and sandwiched between two sidewalls of the limit slot.

7. The foldable wireless charging stand according to claim 4, wherein the one of the two adjacent wireless charging modules is in a form of a plate structure, and the limit slot is defined on a plate surface of the one of the two adjacent wireless charging modules.

8. The foldable wireless charging stand according to claim 7, wherein the articulation shaft comprises a rotation cylinder and a connection shaft; the connection shaft comprises a connection segment and the mounting lug that are integrally molded, the connection segment is fixedly embedded in the rotation cylinder, and the rotation cylinder forms the rotation portion.

9. The foldable wireless charging stand according to claim 8, wherein the mounting lug has two limiting wall surfaces that are opposite to each other, and each of the limiting wall surfaces is abutted against a corresponding one of the two sidewalls of the limit slot.

10. The foldable wireless charging stand according to claim 1, wherein the articulation sleeve comprises a barrel, a connection tab, and a nesting tab; an end of the barrel defines the first opening, and the other end of the barrel defines the second opening; the connection tab is connected to a peripheral sidewall of the barrel, and the nesting tab is fixedly connected to an outer wall surface of the connection tab back away from the barrel; the nesting tab defines the wire passage hole, and the wire passage hole is in communication with an inner cavity of the barrel; the barrel is arranged at the mounting notch, and the nesting tab is embedded and fixedly connected to the other of the two adjacent wireless charging modules.

11. The foldable wireless charging stand according to claim 2, wherein the articulation sleeve comprises a barrel, a connection tab, and a nesting tab; an end of the barrel defines the first opening, and the other end of the barrel defines the second opening; the connection tab is connected to a peripheral sidewall of the barrel, and the nesting tab is fixedly connected to an outer wall surface of the connection tab back away from the barrel; the nesting tab defines the wire passage hole, and the wire passage hole is in communication with an inner cavity of the barrel; the barrel is arranged at the mounting notch, and the nesting tab is embedded and fixedly connected to the other of the two adjacent wireless charging modules.

12. The foldable wireless charging stand according to claim 3, wherein the articulation sleeve comprises a barrel, a connection tab, and a nesting tab; an end of the barrel defines the first opening, and the other end of the barrel defines the second opening; the connection tab is connected to a peripheral sidewall of the barrel, and the nesting tab is fixedly connected to an outer wall surface of the connection tab back away from the barrel; the nesting tab defines the wire passage hole, and the wire passage hole is in communication with an inner cavity of the barrel; the barrel is arranged at the mounting notch, and the nesting tab is embedded and fixedly connected to the other of the two adjacent wireless charging modules.

13. The foldable wireless charging stand according to claim 10, wherein the articulation sleeve further comprises a connection ring; the connection ring is fixedly connected to an end face of the barrel defining the first opening and is arranged around the first opening; the connection ring is rotatably connected to the other of the two adjacent wireless charging modules.

14. The foldable wireless charging stand according to claim 1, wherein a retaining wall is arranged in the articulation sleeve, and the rotation portion is embedded in the articulation sleeve and abuts against the retaining wall.

15. The foldable wireless charging stand according to claim 3, wherein a retaining wall is arranged in the articulation sleeve, and the rotation portion is embedded in the articulation sleeve and abuts against the retaining wall.

16. The foldable wireless charging stand according to claim 14, wherein the wire passage hole is defined between the retaining wall and an end surface of the articulation sleeve defining the first opening.

17. The foldable wireless charging stand according to claim 1, wherein a distance between the wire passage hole and an end face of the articulation sleeve where the first opening is located is L1, and a distance between the wire passage hole and an end face of the articulation sleeve where the second opening is located is L2; wherein twice the L1 is less than the L2.

18. The foldable wireless charging stand according to claim 1, wherein each wireless charging module comprises a board body and a wireless charging assembly disposed within the board body; the wireless charging assemblies of the at least two wireless charging modules are all electrically connected through the wire.

19. The foldable wireless charging stand according to claim 1, wherein the wire passage hole is dampenedly connected to the articulation sleeve.

20. The foldable wireless charging stand according to claim 1, wherein the first openings of the plurality of the articulation assemblies are located on a same side on their respective axis.

* * * * *